United States Patent [19]
Tobias et al.

[11] B 3,985,695
[45] Oct. 12, 1976

[54] WATER REDUCIBLE EPOXY ESTER COATING COMPOSITION

[75] Inventors: Michael A. Tobias, Somerville, N.J.; Richard A. Lamanna, Jefferson Borough, Pa.

[73] Assignee: Mobil Oil Corporation, New York, N.Y.

[22] Filed: Nov. 25, 1974

[21] Appl. No.: 526,997

[44] Published under the second Trial Voluntary Protest Program on January 13, 1976 as document No. B 526,997.

[52] U.S. Cl. ................. 260/29.2 EP; 260/31.4 EP; 260/78.41; 260/47 EP; 260/47 EN; 428/260
[51] Int. Cl.² ........................................ C08G 51/24
[58] Field of Search ..... 260/75 EP, 47 EP, 78.4 EP, 260/29.2 EP, 31.4 EP, 830

[56] References Cited
UNITED STATES PATENTS

| | | | |
|---|---|---|---|
| 2,857,354 | 10/1958 | Fang | 260/33.2 |
| 3,649,583 | 3/1972 | Guthrie | 260/30.4 EP |
| 3,844,998 | 10/1974 | Jeffery et al. | 260/47 EP |

OTHER PUBLICATIONS

Handbook of Epoxy Resins, Lee et al., 1967, (pp. 11–18; 12–22; 23; 13–9; 10; 24–29).

*Primary Examiner*—Donald E. Czaja
*Assistant Examiner*—T. Pertilla
*Attorney, Agent, or Firm*—Charles A. Huggett; Hastings S. Trigg

[57] ABSTRACT

A water reducible epoxy ester is prepared by reacting an epoxy resin, preferably a diglycidyl ether of bisphenol A, and a monofunctional epoxy, such as phenyl glycidyl ether, with a dibasic acid (e.g., azelaic acid) followed by reaction with trimellitic anhydride and neutralization of free carboxyl groups. This material is dispersed in an aqueous vehicle, applied to a metal substrate and baked.

11 Claims, No Drawings

WATER REDUCIBLE EPOXY ESTER COATING COMPOSITION

BACKGROUND OF THE INVENTION

1. Field of the Invention

This invention is concerned with an improved epoxy ester composition and baked coatings of it on metal substrates.

2. Description of the Prior Art

Insofar as is now known an epoxy ester using both a polyfunctional epoxy and a monofunctional epoxy have not previously been proposed.

SUMMARY OF THE INVENTION

This invention provides an epoxy ester comprising an ester adduct of a polyfunctional epoxy resin containing more than one 1,2-epoxy group and a monofunctional epoxy with a saturated dibasic acid and trimellitic anhydride, wherein free carboxyl groups are neutralized with ammonia or an amine.

It also provides a coating composition comprising said epoxy ester in an aqueous vehicle and metal substrates coated therewith.

DESCRIPTION OF PREFERRED EMBODIMENTS

The epoxy resin can be any polyglycidyl ether of polyhydric organic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2-bis(p-hydroxyphenyl) propane, commonly known as bisphenol A, is more widely available in commerce and is preferred. While polyglycidyl ethers can be used, diglycidyl ethers are preferred.

The preferred epoxy resins will have an epoxy equivalent (grams of resin containing one gram-equivalent of epoxide) of between about 170 and about 2200 and an epoxy value between about 0.60 and about 0.05 equivalents epoxy/ 100 grams. The preferred epoxy resins, i.e., those made from bisphenol A, will have two epoxy groups per molecule.

The monofunctional epoxy compound has an epoxy equivalent weight between about 90 and about 200 and will comprise about 2 to 15 weight percent of the final polymer. Non-limiting examples of the monofunctional epoxy are aromatic glycidyl ethers, such as phenyl glycidyl ether and cresyl glycidyl ether; aliphatic glycidyl ethers, such as butyl glycidyl ether and octyl glycidyl ether; aromatic epoxides, such as styrene oxide and α-methyl styrene oxide; aliphatic epoxides, such as 1,2-epoxybutane and 1,2-epoxyoctane; and cycloaliphatic oxides, such as 1,2-epoxycyclohexane and 1,2-epoxynorbornane.

The ratio of polyfunctional epoxy resin to monofunctional epoxy compound will be between about 3 and about 5, based upon the epoxide equivalent weight of each component.

The aliphatic dicarboxylic acid reacted with the epoxides has the structure $HOOC(CH_2)_nCOOH$, wherein n is 4–8. The aliphatic dicarboxylic acids include adipic acid, pimelic acid, suberic acid, azelaic acid, and sebacic acid. Azelaic acid is preferred. The ratio of equivalents of aliphatic dicarboxylic acid to total available epoxide (polyfunctional epoxy resin plus monofunctional epoxy compound) is between 1.0 and 1.2.

The reaction between polyfunctional epoxy resin, monofunctional epoxy compound, and aliphatic dicarboxylic acid is carried out in a suitable solvent, such as methyl ethyl ketone (about 5–10 wt. % of reactants). These reactants are dissolved in the methyl ethyl ketone at about 85°–95°C. Then, the reaction mixture containing, preferably, a catalyst is heated to about 150°C. and maintained at that temperature under reflux for about 1.5 hours until the alcoholic acid number is, 3-22, preferably 11-14, and the epoxy content is 0.025,–0.035 meq./g. It is generally feasible to remove some of the methyl ethyl ketone through a suitable reflux trap, such as a Dean-Stark trap, in order to maintain reflux temperature.

The esterification reaction and the subsequent reaction with trimellitic anhydride, infra, can occur without the aid of a catalyst. Catalysts are preferred, however, such as quaternary ammonium hydroxides, such as benzyltrimethylammonium hydroxide; tertiary amines, such as triethylamine, tri-n-butylamine; N,N-dimethylaniline; N,N-benzylmethylamine; and KOH.

After the desired epoxy content has been attained, the reaction mixture is cooled (about 120°C.) and an amount of methyl ethyl ketone is added to make up the amount previously removed to maintain reflux. Then, trimellitic anhydride is added to the reaction mixture and the reaction is maintained at about 120°C. for about 2.5 hours until the alcohol acid number and the aqueous acid number are substantially equal, indicating absence of anhydride moieties. The amount of trimellitic anhydride used is such that the ratio of anhydride equivalents in trimellitic anhydride to total available epoxide is 0.10 – 0.30. The acid number of the final polymer will be in the range of about 40 to 80.

The final polymer mixture is diluted to a solids content of about 65 – 75 with an alkoxy ethanol, such as butoxyethanol (Butyl Cellosolve), methoxyethanol (Methyl Cellosolve), ethoxyethanol(Cellosolve) and hexoxyethanol (Hexyl Cellosolve) and an alcohol, such as t-butyl alcohol. A preferred combination is Butyl Cellosolve and t-butyl alcohol, using about equal parts by weight of each.

To make the final coating composition the aforedescribed diluted polymer is further reduced with water and a neutralizing amine to afford a water-based epoxy ester. The total solids content will be between about 29–31% and a pH of 7-9. The viscosity should be about 50–75 inches, No. 4 Ford Cup. Utilizable neutralizing amines include ammonia and N,N-dimethylethanolamine. The latter is preferred.

The coating composition can contain other well known adjuvants such as lubricants (waxes, etc.), surfactants, and wetting, leveling, and flow control agents. The coating compositions as described are clear solutions, but they can be pigmented with any of the usual pigments known in the coatings art.

The water-reduced coating composition can be applied to a variety of metal substrates suitable for making metal cans, such as tinplated steel, tin-free steel, and aluminum, The coating composition is applied by roll coat, spray, or brush to a coating weight of 3–5 mg./sq. in.

Baking to cure the coatings is satisfactorily carried at about 350°F. for about 10 minutes to about 450°F. for about 5 minutes. At temperatures below about 350°F. it is necessary to use an aminoplast and at below 300°F., long bake times of about 30 minutes are required. At temperatures of about 500°F., short bake times (½ min.) and an aminoplast may both be required. Any aminoplast well known in the art can be used, such as an alkylated melamine. Water soluble aminoplasts would be preferred.

EXAMPLE 1

A four liter resin kettle was charged with 111.0 g. of methyl ethyl ketone and 1000.0 g. of epoxy resin (a diglycidyl ether of bisphenol A) having an epoxide content of 2.05 meq. epoxy/g. The mixture was heated to dissolve the epoxy resin and then further heated to 95°C. at which point 270.0 g. of azelaic acid was added. The reaction mixture was reheated to 85°C., at which point 81.0 g. of phenyl glycidyl ether and 3.3 g. of tri-n-butylamine were added. The temperature was raised gradually to 150°C. while removing sufficient methyl ethyl ketone (~ 63 g.) to maintain controlled reflux at this temperature. The reaction was maintained at 150°C. for 1.5 hours until an alcoholic acid number of 11–14 and an epoxy content of 0.025–0.035 meq/g. were obtained. The reaction mixture was then cooled to 120°C. and an amount of fresh methyl ethyl ketone, equal to that removed earlier, was added. The temperature was again adjusted to 120°C. and 130.0 g. of trimellitic anhydride was added. The reaction was maintained at 120°C. for 2.5 hours until an alcoholic acid number of 61.8 and an aqueous acid number of 65.1 were obtained. The reaction was cooled to 110°C. and 291.0 g. of Butyl Cellosolve added. Further cooling to 95°C. was followed by addition to 291.0 g. of t-Butyl Alcohol.

EXAMPLES 2, 3 and 4

Followiwng the procedure of Example 1, three epoxyesters were prepared. The principal variations were in the amounts of trimellitic acid and of alcoholic solvents. The pertinent data are set forth in Table I, in which the data for Example 1 are included for ready comparison.

TABLE I

| Component, g. | EXAMPLE | | | |
|---|---|---|---|---|
| | 1 | 2 | 3 | 4 |
| Epoxy resin* | 1000 | 1000 | 1000 | 1000 |
| Phenyl glycidyl ether | 81 | 81 | 81 | 78 |
| Azelaic acid | 270 | 270 | 270 | 261 |
| Trimellitic anhydride | 130 | 115 | 100 | 126 |
| Tri-n-butylamine | 3.3 | 3.3 | 3.3 | 3.6 |
| Methyl ethyl ketone | 111 | 111 | 111 | 110 |
| Butyl Cellosolve | 291 | 286 | 284 | 257 |
| t-Butyl alcohol | 291 | 286 | 284 | 257 |
| Final acid numbers | | | | |
| Alcoholic | 61.8 | 55.8 | 48.2 | 62 |
| Aqueous | 65.1 | 62.3 | 54.8 | 65 |

*2.05 meq. epoxy/g.

COATING EVALUATION

The epoxy ester solutions of Examples 1–4 were diluted with water and sufficient N,N-dimethylethanolamine and other additives as described in Example 5, infra, to give a clear water-based coating composition having the solids content and pH indicated in Table II. Each composition was applied by roller to tin-plated steel (ETP) and aluminum at a rate of 3.5 mg./in.$^2$. Each coating was baked 10 min. at 400°F. and film properties were evaluated. In the evaluation a rating of 10 is perfect for blush and adhesion and 30 is perfect for beer can end rating. The data are set forth in Table II.

TABLE II

| Physical properties | 1 | 2 | 3 | 4 |
|---|---|---|---|---|
| Solids, % | 29.5 | 29.7 | 30.2 | 30 |
| Viscosity No. 4 Ford Cup | 60" | 68" | 63" | 60" |
| pH | 8.2 | 8.5 | 8.5 | 8.5 |
| Film properties | | | | |
| MEK resistance (double rub) | 30 | 40 | 30 | 30 |
| Process resistance 90 at 250°F. | | | | |
| Blush | 10 | 10 | 10 | 10 |
| Adhesion | 10 | 10 | 10 | 10 |
| Fuming resistance | Good | Good | Good | Good |
| Gloss | Exc. | Exc. | Exc. | Exc. |
| Beer can end (double seam) ETP | 26 | 23 | 23 | 23 |
| Al | 27 | 27 | 27 | 27 |

EXAMPLE 5

To 460g. of the product of Example 4 were added 30.5g. of N,N-dimethylethanolamine and 485g. of deionized water to produce a Step 1 product.

To an agitated mixing vessel were charged 914.3g. of Step 1 product and up to 4g. of N,N-dimethylethanolamine was added as needed to adjust pH to the specified value (8.5) and the vessel contents were stirred until uniform. There were separately mixed 60g. deionized water and 1.8g. of microcrystalline wax emulsion (50.5% solids) and the resultant mixture was added to the contents of the mixing vessel and stirred until uniform. There were separately mixed 0.4g. 2,4,7,9-tetramethyl-5-decyn-4,7-diol and 0.4g. n-butanol and the resultant solution was added to the contents of the mixing vessel and stirred until uniform. There were separately mixed 0.7g. of a fluorocarbon (FC-430; a 3M Company flow control agent; Brookfield viscosity 15,000 cp. at 25°C., density 1.16 at 25°C.) and 0.7g. isopropanol and the resultant mixture was added to the contents of the mixing vessel and stirred until uniform. Then, sufficient deionized water (up to 17.7g. as needed) was added to the contents of the mixing vessel to adjust the viscosity to 60 inches, No. 4 Ford cup. The coating thus prepared had 30% solids and a pH of 8.5.

The coating was applied to tin-plated steel at a rate of 3.2 mg./in.$^2$ and baked for 10 min. at 375°F. The baked finish rated 30 MEK double rubs and on processing (90' at 250°F) it rated 10 on blush and 10 on adhesion. On beer can end (double seam) ETP it rated 23 and 27 on aluminum.

VARIATIONS

EXAMPLES 6 and 7

Two epoxy-esters were prepared, following the procedure of Example 1, using different epoxy resins (diglycidyl ether of bisphenol A) and using adipic acid instead of azelaic acid. The recipes used are set forth in Table III.

TABLE III

| Component, g. | EXAMPLE | |
|---|---|---|
| | 6 | 7 |
| Epoxy resin | | |
| 5.44 meq./g. | 1000 | |
| 3.36 meq./g. | | 1000 |
| Phenyl glycidyl ether | 211.5 | 131 |
| Adipic acid | 550.8 | 340 |
| Trimellitic anhydride | 162 | 125 |
| Tri-n-butylamine | 3.3 | 3.3 |
| Methyl ethyl ketone | 111 | 111 |
| Butyl Cellosolve | 266 | 285 |
| t-Butyl Alcohol | 266 | 285 |
| Final acid numbers | | |
| Alcoholic | 72.9 | 47.1 |
| Aqueous | 76.8 | 52.7 |

EXAMPLE 8

Using the procedure set forth in Examples 4 and 5, a coating was prepared as described in Examples 4 and 5, except that cresyl glycidyl ether was used instead of phenyl glycidyl ether. Pertinent data and evaluation of baked coating on tinplated steel are set forth in Table IV.

EXAMPLE 9

Using the procedure set forth in Example 1, an epoxy-ester was prepared using the recipe of Example 1 with the exception that 135g. of succinic anhydride was used in place of trimellitic anhydride. The final acid numbers were 61.8 alcoholic and 66.4 aqueous.

The resultant epoxy-ester was made into a coating composition, using the procedure of Example 5. Evaluation of baked coating on tinplated steel (ETP) and TFS (tin free steel) are set forth in Table IV. For comparison, data for coating of Example 5 are included in Table IV.

cinic anhydride (Example 9). Also, the coating composition of Example 9 had poorer storage stability.

The properties of the resin of this invention contribute to a wide variety of uses other than can coatings. When pigmented with carbon black at a pigment/binder ratio of about 0.1/1, modified with a crosslinking agent such as a methylated urea, applied on cold rolled steel to a dry film thickness of 0.2–0.4 mil. and baked for about 60 seconds at 500°F., the resultant coated metal can be subjected to the severe fabrication required for end uses such as canisters for photographic film without degradation of the coating.

Another end use is as a primer for cold rolled steel or hot dipped galvanized steel which after application of suitable topcoat enamels will be fabricated into appliance parts (washers, dryers, refrigerators, etc.). For this end use, an inhibitive pigment such as zinc chromate or strontium chromate would be incorporated as a portion of the total pigmentation with the total pigment/binder ratio being about 0.5/1. Again, the addition of a crosslinking agent would be desirable. The usual film thickness for primers for this end use is 0.2–0.4 mil; the normal bake cycle is about 30 seconds at 700°F. air temperature.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An epoxy ester comprising an ester adduct of a polyfunctional epoxy resin containing more than one 1,2-epoxy group and a monofunctional 1,2-epoxy with a saturated dibasic acid the ratio of said polyfunctional epoxy resin to said monofunctional epoxy being 3–5 based upon epoxide equivalent weight, the ratio of equivalents of said dibasic acid to total epoxide being

TABLE IV

| Physical properties | EXAMPLE | | |
|---|---|---|---|
| | 8 | 5 | 9 |
| Solids, % | 30 | 30 | 25 |
| Viscosity No. 4 Ford Cup | 60" | 60" | 75" |
| pH | 8.6 | 8.5 | 8.5 |
| Film properties | | | |
| Coating wt., mg./in.² | 3.3 | 3.2 | 3.3 |
| Bake, 10' at °F. | 375 | 375 | 375 |
| Wetting (10 = perfect) | 10 | 10 | 9+ |
| MEK resistance (double rubs) | 33 | 30 | 15 |
| Process resist. (90' at 250°F.) | | | |
| Blush | 9 | 10 | 10 |
| Adhesion | 10 | 10 | 10 |
| Beer can end (double seam) ETP | 23 | 23 | 22 |
| TFS | 27 | 27 | 26 |
| Storage stability* | | | |
| Room temperature | >4 mo.⁽¹⁾ | >7 mo.⁽¹⁾ | >2 mo.⁽¹⁾ |
| 100°F. | 6 wks. | 6 wks. | 3 wks. |
| 120°F. | 2 wks. | 2 wks. | 1 wk. |

*Time for coating composition to gel when stored at indicated temperature.
⁽¹⁾Still on test.

From the data in Table IV it will be noted that all the coating compositions produced films having excellent properties. By comparing Example 5 (trimellitic anhydride) with Example 9 (succinic anhydride), two significant differences can be seen. In order to obtain a coating composition having a reasonable viscosity, the solids content had to be reduced to an undesirably low level, in the case of the coating composition with suc- 1.0–1.2 and trimellitic anhydride, the ratio of anhydride equivalents in said trimellitic anhydride to total epoxide being 0.1–0.3; the reaction between said epoxy resin, said monofunctional epoxy, and said dibasic acid being carried out in a solvent at elevated temperature until the alcoholic acid number is 3–22 and the epoxy content is 0.025–0.035 meq./g to obtain an initial ester and reacting said initial ester with trimellitic anhydride at a lower elevated temperature until the alcoholic acid number and the aqueous acid number are substantially equal.

2. The epoxy ester of claim 1 wherein said polyfunctional epoxy resin is a diglycidyl ether of bisphenol A.

3. The epoxy ester of claim 2 wherein said monofunctional epoxy is phenyl glycidyl ether, and said dibasic acid is azelaic.

4. The epoxy ester of claim 2 wherein said monofunctional epoxy is phenyl glycidyl ether and said dibasic acid is adipic acid.

5. A coating composition comprising the epoxy ester of claim 1 neutralized with ammonia or N,N-dimethylethanolamine and diluted with water to a solids content of 29–31%.

6. A coating composition comprising the epoxy ester of claim 2 neutralized with ammonia or N,N-dimethylethanolamine and diluted with water to a solids content of 29–31%.

7. A coating composition comprising the epoxy ester of claim 3 neutralized with ammonia or N,N-dimethylethanolamine and diluted with water to a solids content of 29–31%.

8. A process for preparing the epoxy ester defined in claim 3, which comprises reacting a diglycidyl ether of bisphenol A and phenyl glycidyl ether with azelaic acid in methyl ethyl ketone, the ratio of said diglycidyl ether to phenyl glycidyl ether being 3–5 based upon epoxide equivalent weight, the ratio of equivalents of azelaic acid to total epoxide being 1.0–1.2, at 150°C. until the acid number is 11–14 and the epoxy content is 0.025 – 0.035 meg./g to obtain an initial ester, reacting said initial ester with trimellitic anhydride using a ratio of anhydride equivalents in trimellitic anhydride to total epoxide of 0.1 – 0.3, at 120°C. until the alcoholic acid number and aqueous acid number are substantially equal, and diluting the product to a solids content of 65 – 75% with a 50:50 mixture of butyl cellosolve and t-butyl alcohol.

9. A metal substrate coated with the coating composition of claim 5.

10. A metal substrate coated with the coating composition of claim 6.

11. A metal substrate coated with the coating composition of claim 7.

* * * * *